(12) United States Patent
Tseytlin et al.

(10) Patent No.: US 9,369,354 B1
(45) Date of Patent: Jun. 14, 2016

(54) DETERMINING RELATED CONTENT TO SERVE BASED ON CONNECTIVITY

(71) Applicant: Google Inc., Mountain View, CA (US)

(72) Inventors: Yan Tseytlin, Wayne, NJ (US); Mehmet Emre Sargin, Sunnyvale, CA (US)

(73) Assignee: GOOGLE INC., Mountain View, CA (US)

( * ) Notice: Subject to any disclaimer, the term of this patent is extended or adjusted under 35 U.S.C. 154(b) by 281 days.

(21) Appl. No.: 14/080,190

(22) Filed: Nov. 14, 2013

(51) Int. Cl.
*G06F 15/173* (2006.01)
*H04L 12/24* (2006.01)

(52) U.S. Cl.
CPC ................................. *H04L 41/5058* (2013.01)

(58) Field of Classification Search
USPC .......................................... 709/223, 224, 238
See application file for complete search history.

(56) References Cited

U.S. PATENT DOCUMENTS

| 8,498,628 | B2 | 7/2013 | Shapiro et al. |
| 8,548,848 | B1 * | 10/2013 | Shaw et al. ................... 705/14.1 |
| 2007/0038642 | A1 * | 2/2007 | Durgin et al. .................... 707/10 |
| 2007/0088707 | A1 * | 4/2007 | Durgin et al. .................... 707/10 |
| 2008/0201225 | A1 | 8/2008 | Maharajh et al. |
| 2010/0057924 | A1 | 3/2010 | Rauber et al. |
| 2012/0023201 | A1 | 1/2012 | Gideon et al. |
| 2012/0324538 | A1 | 12/2012 | Malegaonkar et al. |
| 2013/0173524 | A1 * | 7/2013 | Hueter et al. .................... 706/50 |
| 2015/0012510 | A1 * | 1/2015 | van der Laan et al. ........ 707/702 |

* cited by examiner

*Primary Examiner* — Liangche A Wang
(74) *Attorney, Agent, or Firm* — Lowenstein Sandler LLP (57) ABSTRACT

A system and method for determining related content to serve based on connectivity is provided. The system includes a connectivity analyzer to analyze an aspect of the connectivity of the detected access to the content sharing service; a vector aggregator to create an access vector based on the analyzed aspect of the connectivity; and a related content retriever to retrieve related content based on the access vector.

20 Claims, 4 Drawing Sheets

DETERMINING RELATED CONTENT TO SERVE BASED ON CONNECTIVITY

BACKGROUND

Content sharing services serve content, such as pictures, audio, video, text, or combinations thereof, to visitors who access the content sharing service. The content may be sourced from a publisher, automatically generated, or uploaded by one of the visitors to the content sharing service. The content may be represented as digitally encoded information. The content sharing service may store the content, or link to other services and retrieve the content prior to serving the content to the visitors.

The content sharing service may augment the serving of the content with shared content. The shared content may be served before, during or after the presentation of the content. The shared content may be associated with meta information, and when the shared content is clicked-through by a visitor, the visitor may be redirected to additional content associated with the shared content. The shared content may provide information associated with a product or service related to the content.

The content sharing service may monetize the shared content service. Thus, a third-party may purchase a right to distribute content along with the shared content. Accordingly, as more visitors access content through the content sharing service, the content sharing service may serve more shared content, thereby increasing revenue associated with the viewing of shared content.

Further, the content sharing service may monetize the shared content serving according to the number of visitors who view the shared content. Thus, as more visitors access the shared content, the content sharing service may earn more revenue.

The content sharing service may select content to be presented to a visitor based on the visitor's perceived interest, previous accesses, and content likely to incentivize the visitor to remain connected to the content sharing service. While the visitor is being served content, or after the visitor has finished accessing a specific content item, the content sharing service may present a list of recommended content for the visitor to access. Thus, by encouraging the visitor to remain on the content sharing service, the content sharing service may serve more shared content or have larger audiences for a specific shared content item.

The visitor may employ various techniques to access the content. For example, the visitor may access the content sharing service through a browser or mobile application installed on a device. The visitor may employ various devices to access the content sharing service. For example, the visitor may employ a personal computer workstation to access the content sharing service during the daytime hours. In the evening hours, the visitor may employ a mobile device to access the content sharing service.

SUMMARY

A system and method for determining related content to serve based on connectivity is provided. The system includes a connectivity analyzer to analyze an aspect of the connectivity of the detected access to the content sharing service; a vector aggregator to create an access vector based on the analyzed aspect of the connectivity; and a related content retriever to retrieve related content based on the access vector.

A method for creating an access vector based on aspects of connectivity to a content sharing service is provided. The method includes detecting an access to content served via the content sharing service; analyzing an aspect of the detected access; and based on the analyzed aspect, creating the access vector, the detected access being at least one of a device employed to access the content sharing service, a connection speed associated with the detected access, a time associated with the detected access, and a day associated with the detected access.

DESCRIPTION OF THE DRAWINGS

The detailed description refers to the following drawings, in which like numerals refer to like items, and in which.

DETAILED DESCRIPTION

A content sharing service serves content, and shared content distributed along with the content. The content and shared content may be pictures, audio, video, text, or combinations thereof. The shared content may be served before, during, or after the presentation of content.

A visitor may access the content sharing service via a device, such as a personal computer, a mobile device, or an IP television, for example. A specific visitor may employ various devices at various points in a day to access the content sharing service. For example, the visitor may employ a personal computer during the day and a mobile device during the evening.

The various devices may incorporate various applications and techniques for accessing the content sharing service. For example, the personal computer may have a browser, and the browser may download an embedded content player to serve content. The mobile device may incorporate an application, and the application may download a compressed version of the content to display on the mobile device.

Further, the visitor's viewing experience on each device may be uniquely tailored to the device accessing the content. For example, the visitor viewing a specific content item on an IP television may differ starkly from the visitor viewing the same content item on a mobile device. This may be due to the screen size, the screen resolution, the connectivity speed, the audio capabilities, for example, associated with each device.

Disclosed herein are methods and systems for determining related content to serve based on connectivity. By analyzing certain signals associated with a visitor's connectivity to a content sharing service, the content sharing service may determine the content to serve or present as an option to select. The signals may aid in selecting content that is more likely to encourage a visitor to access the content, and thus remain on the content sharing service.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Figure 1:
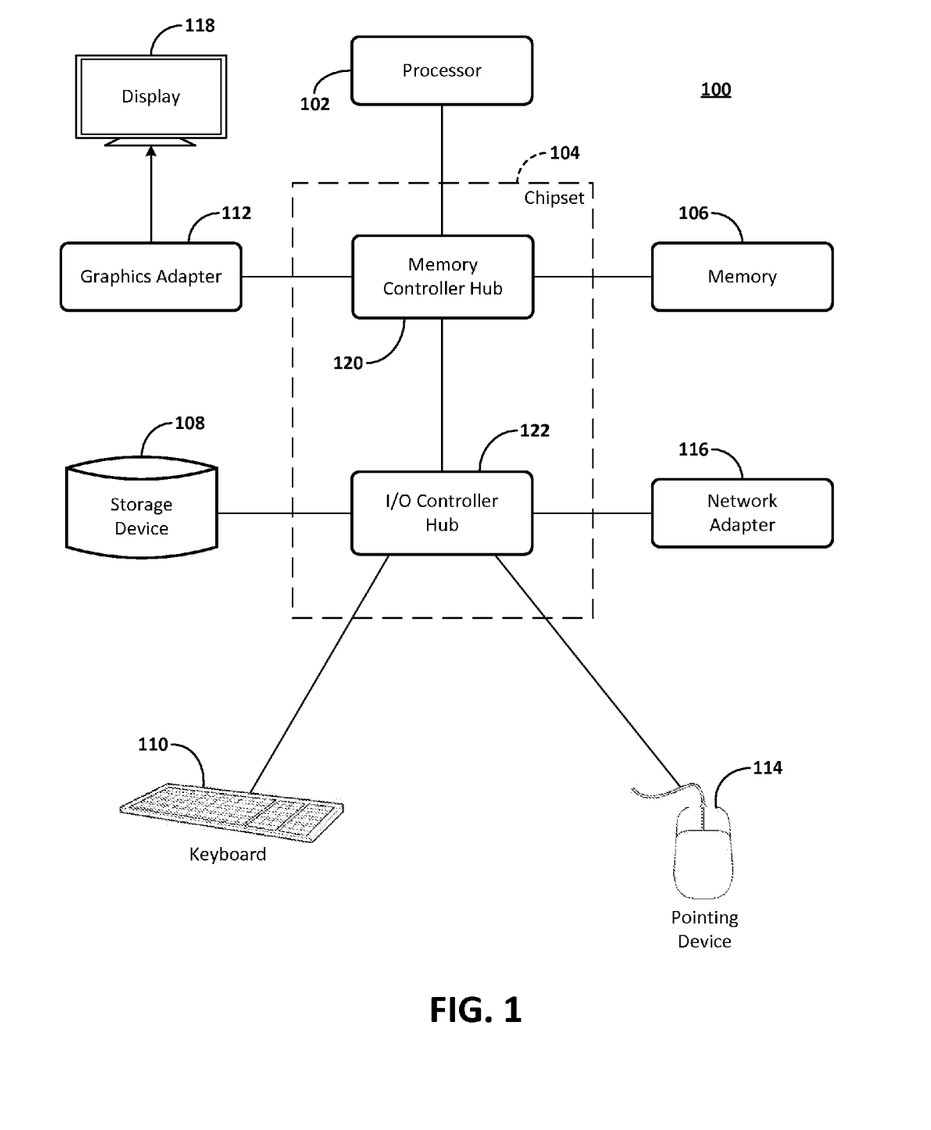
FIG. 1 is a block diagram illustrating an example computer.

FIG. 1 is a block diagram illustrating an example computer 100. The computer 100 includes at least one processor 102 coupled to a chipset 104. The chipset 104 includes a memory controller hub 120 and an input/output (I/O) controller hub 122. A memory 106 and a graphics adapter 112 are coupled to the memory controller hub 120, and a display 118 is coupled to the graphics adapter 112. A storage device 108, keyboard 110, pointing device 114, and network adapter 116 are coupled to the I/O controller hub 122. Other embodiments of the computer 100 may have different architectures.

The storage device 108 is a non-transitory computer-readable storage medium such as a hard drive, compact disk read-only memory (CD-ROM), DVD, or a solid-state memory device. The memory 106 holds instructions and data used by the processor 102. The pointing device 114 is a mouse, track ball, or other type of pointing device, and is used in combination with the keyboard 110 to input data into the computer 100. The pointing device 114 may also be a gaming system controller, or any type of device used to control the gaming system. For example, the pointing device 114 may be connected to a video or image capturing device that employs biometric scanning to detect a specific user. The specific user may employ motion or gestures to command the point device 114 to control various aspects of the computer 100.

The graphics adapter 112 displays images and other information on the display 118. The network adapter 116 couples the computer system 100 to one or more computer networks.

The computer 100 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 108, loaded into the memory 106, and executed by the processor 102.

The types of computers used by the entities and processes disclosed herein can vary depending upon the embodiment and the processing power required by the entity. The computer 100 may be a mobile device, tablet, smartphone or any sort of computing element with the above-listed elements. For example, a data storage device, such as a hard disk, solid state memory or storage device, might be stored in a distributed database system comprising multiple blade servers working together to provide the functionality described herein. The computers can lack some of the components described above, such as keyboards 110, graphics adapters 112, and displays 118.

The computer 100 may act as a server (not shown) for the content sharing service disclosed herein. The computer 100 may be clustered with other computer 100 devices to create the server. The various computer 100 devices that constitute the server may communicate with each other over a network 250.

Figure 2:
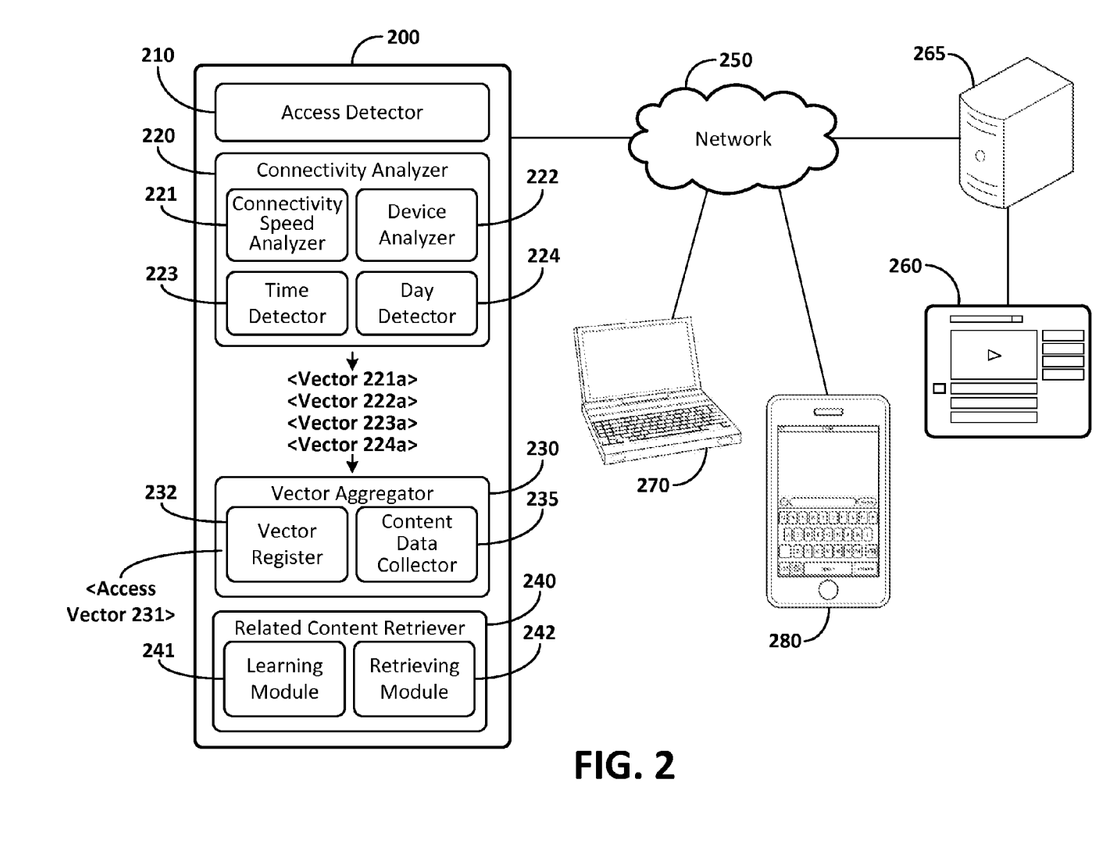
FIG. 2 illustrates an example of a system for determining related content to serve via a content sharing service.

FIG. 2 illustrates an example of a system 200 for determining related content to serve via a content sharing service 260. The system 200 includes an access detector 210, a connectivity analyzer 220, a vector aggregator 230, and a related content retriever 240.

The system 200 may communicate with the content sharing service 260 via network 250. Alternatively, the system 200 may be incorporated or Implemented with the content sharing service 260. The content sharing service 260 may be stored on a server 265. The server 265 may be a device such as computer 100 described above.

A visitor may employ a device 270 or device 280 to access the content sharing service 260. As shown, the device 270 is a personal computer, and the device 280 is a mobile device; however, the device 270 and the device 280 may be any device employed to access the content sharing service 260, such as those enumerated above in regards to computer 100. A single visitor to the content sharing service 260 may employ device 270 and device 280 at different moments to access the content sharing service 260. Device 270 and device 280 may employ different network connections to access network 250, and device 280. The network connections may be any sort of wireless or wired connection technique employed to access a wide area network (WAN) or a local area network (LAN).

The access detector 210 detects an access to the content sharing service 260 by a visitor employing a device, such as device 270 or device 280. In response to the visitor accessing the content sharing service 260, the access detector 210 initiates system 200 to analyze the signals associated with the visitor's connectivity to the content sharing service 260.

The connectivity analyzer 220 analyzes the access detected by the access detector 210, to determine various aspects of the visitor's connectivity to the content sharing service 260. The connectivity analyzer may create an access vector 231 associated with the visitor. The access vector 231 may be employed by system 200 to determine related content to serve to the visitor. The connectivity analyzer 220 may selectively include a connection speed analyzer 221, a device analyzer 222, a time detector 223, and a day detector 224.

The connection speed analyzer 221 determines the connection speed associated with the detected access. For example, the visitor accessing the content sharing service 260 may ascertain that the connection speed is a wired T1 connection. The connection speed analyzer 221 may create a vector 221a denoting the connection speed as being a T1 connection. In another example, the connection speed analyzer 221 may ascertain that the connection speed is facilitated by a 3G network. The connection speed analyzer 221 may create a vector 221a denoting the connection speed as being a 3G network.

Based on the connection speed, the visitor to the content sharing service 260 may be interested in a specific type of content. For example, if the visitor is connecting via a faster connection (such as a T1 connection), the visitor may be more interested in longer content, or higher resolution content, such as long form movies. Conversely, if the visitor is connecting via a slower connection (such as a 3G network), the visitor may be more interested in shorter content, or lower resolution content.

The device analyzer 222 determines a device employed by a visitor to the content sharing service 260 based on the detected access. For example, if the visitor employs a personal computer, such as a laptop or desktop, to access the content sharing service 260, the device analyzer 222 may create a vector 222a denoting that a personal computer is employed to access the content sharing service 260. In another example, if the visitor employs a mobile device to access the content sharing service 260, the device analyzer 222 may create a vector 222b denoting that a mobile device is employed to access the content sharing service 260.

Based on the device employed to access the content sharing service 260, the visitor to the content sharing service 260 may be interested in a specific type of content. For example, if the visitor is connecting via an IP television, the visitor may be more interested in longer-form content (i.e. a full length feature movie), or higher resolution content. Conversely, if the visitor is connecting via a mobile device, the visitor may be more interested in shorter content, or lower resolution content.

The time detector 223 determines a time associated with the detected access. For example, the time detector 223 may create a vector 223a to denote that the visitor accessed the content sharing service 260 in the morning. In another example, the time detector 223 may create a vector 223a to denote that the visitor accessed the content sharing service 260 in the afternoon (for example, during a rush hour commute).

Based on the time associated with the detected access, the visitor to the content sharing service 260 may be interested in a specific type of content. For example, if the visitor accesses the content sharing service 260 during work hours, the visitor may be interested in educational or work-related content. Alternatively, if the visitor accesses the content sharing service 260 during after work hours, the visitor may be interested in entertainment based content.

The day detector 224 determines a day associated with the detected access. For example, the day detector 224 may create a vector 224a to denote that the visitor accessed the content sharing service 260 on a Monday. In another example, the day detector 224 may create a vector 224a to denote that the visitor accessed the content sharing service 260 on a Saturday.

Based on the detected day, the visitor may be interested in specific content. For example, the visitor may be interested in content associated with football on a Monday or Tuesday. Alternatively, the visitor may be interested in kids' related programming on a Saturday morning.

The vector aggregator 230 aggregates the vectors created by the connectivity analyzer 220 to create an access vector 231. System 200's implementer may determine which of the vectors created by the connectivity analyzer 220 to employ, as well as a weighting associated with each of the vectors. Thus, the access vector 231 may be defined by the following relationship (where W, X, Y, and Z are predetermined weights associated with each of the vectors created by the connectivity analyzer 220):

[W*vector 221a; X*vector 222a; Y*vector 223a; Z*vector 224a]

The access vector 231 may be stored in a storage device, such as access vector register 232. The access vector register 232 may be dynamically updated at predetermined intervals, or based on a stimulus, such as a detected access to content sharing service 260.

The vector aggregator 230 includes a content data collector 235. The content data collector 235 analyzes the content associated with the detected access. The content data collector 235 may store various aspects of content associated with a specific vector in a lookup table.

The following aspects of the content associated with the detected access may be recorded:
  1) Content length;
  2) If the content is video-only or audio-only;
  3) Content genre;
  4) Whether the content is part of a playlist associated with the visitor;
  5) Whether the content was previously queued (i.e. through a 'watch later' function);
  6) Whether the content is part of a subscription;
  7) Whether the content was originally sourced from a social network;
  8) Whether the visitor passively consumed the content, or whether the visitor engaged a selectable option associated with the content presentation; and
  9) If the content belongs to a predefined group of content, the percentage of the predefined group of content the visitor has accessed.

The content data collector 235 may collect data associated with each vector. Thus, the above-enumerated aspects may be recorded per vector. For example, the content data collector 235 may observe that a visitor accessing the content sharing service 260 with device 280 accesses football content on a Monday morning.

The related content retriever 240 includes a learning module 241 and a retrieving module 242. Both the learning module 241 and the retrieving module 242 may be activated simultaneously. Alternatively, the learning module 241 and the retrieving module 242 may be activated individually.

The learning module 241 creates a correlation with the various vectors created by the connectivity analyzer 220 and the vector aggregator 230, and the data recorded by the content data collector 235. Thus, the learning module 241 may record the data associated with the detected access, and correspond the data with a specific connection speed, device, access time, or access day.

For example, the learning module 241 may ascertain that the visitor accesses football content on Monday morning via device 280 with a frequency over a predetermined threshold. The learning module 241 may create or update a record of this in a learning vector 241a stored in a learning vector register 241b.

In another example, the learning module 241 may ascertain that the visitor accesses children's programming on Saturday morning via device 270 with a frequency over a predetermined threshold. The learning module may create or update the learning vector 241a based on this correspondence.

The retrieving module 242 retrieves content to be presented along with or after the serving of content that a visitor to the content sharing service 260 is presently consuming. The retrieved content may be presented via previews, thumbnails or mosaic Icons over the content presently being consumed, or in an area adjacent to an embedded player presenting the content.

The retrieving module 242 may employ the learning vector 241a to determine content to be retrieved. Alternatively, or in addition to, the retrieving module 242 may employ a default learning vector sourced from the content sharing service 260. The learning vector 241a may be personalized for each visitor. On the contrary, the default learning vector 281a (sourced from the content sharing service 260) may be a generalized vector indicating preferences for all, or a subset of visitors, to the content sharing service 260.

The retrieving module 242 may be configured to employ the learning vector 241a first, by specifically ascertaining whether the detected access corresponds to a stored record, and then, rely on the default learning vector 261 if the detected access does not correspond to any records stored in the learning vector 241a. Accordingly, the retrieving module 242 may retrieve content or links to content to recommend to a visitor to the content sharing service 260.

Figure 3:
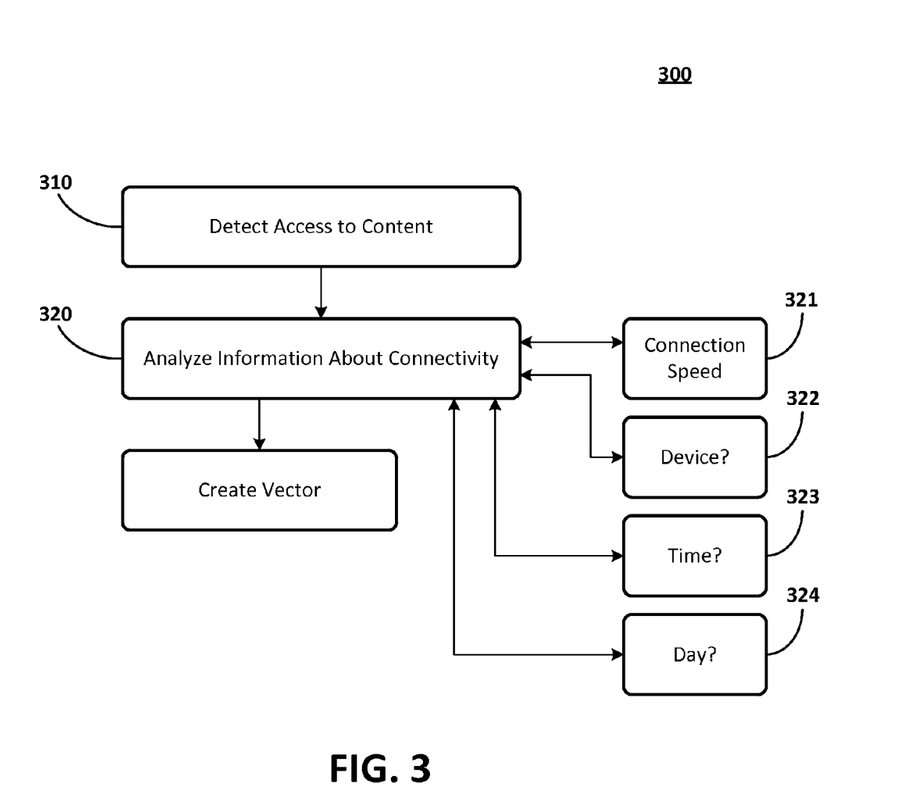
FIG. 3 illustrates an example of a method for creating an access vector.

FIG. 3 illustrates an example of a method 300 for creating an access vector. The method 300 may be Implemented on a device, such as system 200.

In operation 310, an access to a content sharing service 260 is detected. The visitor may employ any device capable of receiving content from the content sharing service 260, such as device 270 and device 280. The visitor may actively select content, or alternatively, be automatically served content via an algorithm employed by the content sharing service 260.

In operation 320, the detected access is analyzed for information about the connectivity. The connectivity may be any sort of parameter associated with how the visitor Interacts with the content sharing service 260.

The connectivity may be related to a connection speed associated with the detected access 321, a device employed with the detected access 322, a time associated with the detected access 323, a day associated with the detected access 324, for example. The analysis performed in operation 320 may employ any combination of the operations discussed with regards to operations 321-324.

In operation 330, a vector is created based on the analysis performed in operation 320. The vector may be generated by weighting the various data collected in operations 321-324. The vector may be stored in a storage device, such as those enumerated above for storage device 108.

Figure 4:
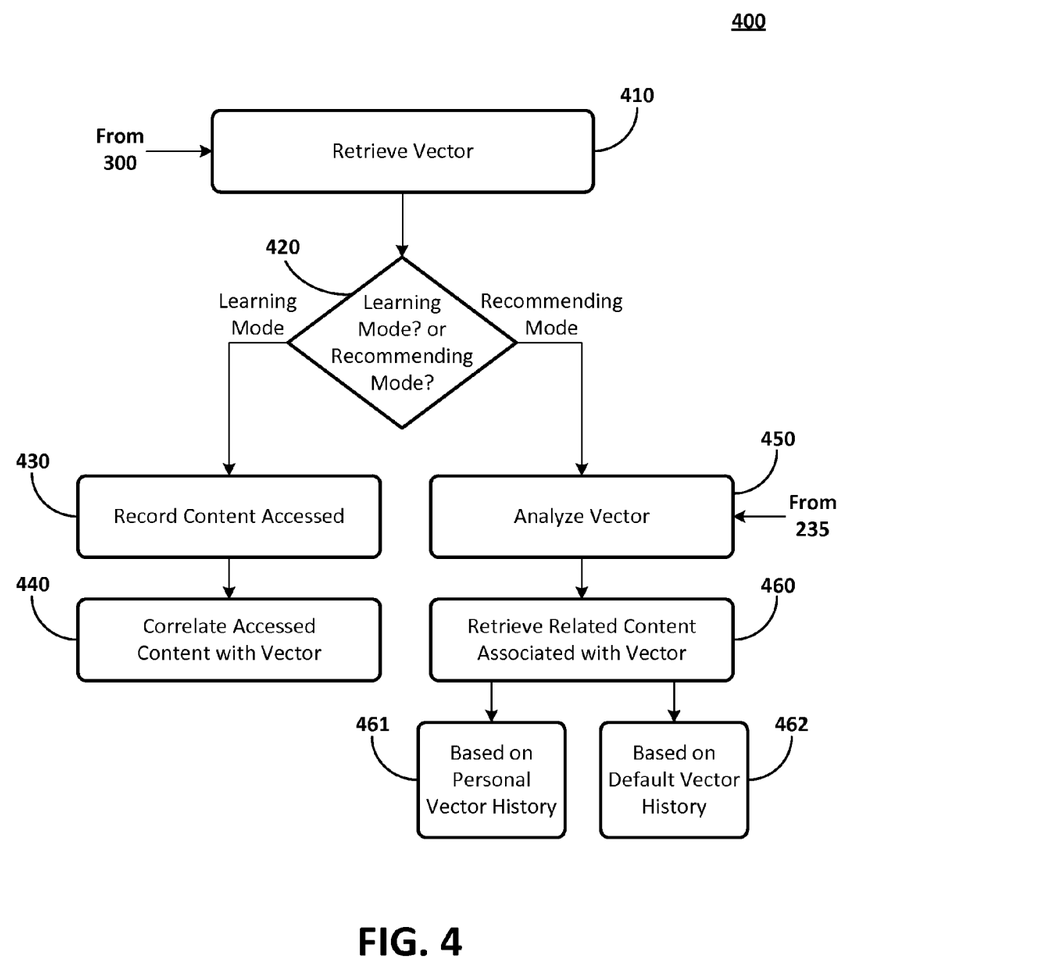
FIG. 4 illustrates an example of a method for determining related content to serve via a content sharing service.

FIG. 4 illustrates a method for determining related content to serve based on connectivity to a content sharing service 260. The method 400 may be performed in conjunction with method 300. The related content may be served along with content presently being accessed by a visitor to a content sharing service 260.

In operation 410, a vector is retrieved. The vector may be created by the method 300 discussed above. Alternatively, the vector may have been created during a previous detected access, and retrieved in response to a current detected access.

In operation 420, a determination is made as to whether to perform a learning operation (operation 430) or a recommending operation (operation 450). As shown in method 400, the method 400 may proceed to either operation 430 or operation 450. In another example, the Implementer of method 400 may perform the learning and recommending operations in parallel.

In operation 430, the content associated with the detected access is analyzed and data associated with the analysis is created. The analysis may follow any of the enumerated items discussed above in regards to the content data collector 235.

In operation 440, the retrieved vector is correlated to the data created in operation 430. If the retrieved vector has previously been correlated, the retrieved vector may be updated. Thus, the correlation between a retrieved vector and content accessed may progressively become more accurate as more data is employed to perform the correlation.

If in operation 420, the determination is made that the method 400 is configured to be in a recommending mode, the method 400 proceeds to operation 450.

In operation 450, the retrieved vector is analyzed. Specifically, the retrieved vector is analyzed to ascertain if the retrieved vector is associated with a correlation (i.e. as created in operation 440). In one example, the retrieved vector may exactly match a vector associated with a correlation. In another example, the retrieved vector Is compared against the correlated vectors to ascertain if the vector is within a predetermined difference with any of the correlated vectors.

For example, the correlated vector may be defined for a visitor with a smart phone accessing content at 9:00 AM. The retrieved vector may be associated with a visitor with a smart phone accessing content at 10:00 AM. The analysis may determine that the 10:00 AM vector's difference with the 9:00 AM vector is within a predetermined threshold.

Further, the analysis performed may take into account the various weightings associated with each category. For example, there may be two correlated vectors, one associated with a laptop on Friday employed to access the content sharing service 260, and another associated with a smart phone on Saturday. The retrieved vector may be associated with a visitor who accesses the content sharing service 260 with a smart phone on a Friday. Thus, the retrieved vector matches the first correlated vector in part due to the day, and matches the second correlated vector in part due to the device. The Implementer of method 400 may set a predetermined weight that prioritizes one category over the other. For example, the implementer may set that device correlations outrank day correlations.

In another example, the retrieved vector may be matched with both of the correlated vectors in the example described above. Thus, in retrieving related content, the method 400 may be configured to retrieve related content associated with both correlated vectors.

In operation 460, related content is retrieved. If based on the analysis performed in operation 450, that a correlated vector matches or is similar to the retrieved vector, the method may proceed to operation 461. Conversely, if there are no correlated vectors that match or are similar to the retrieved vector, the method 400 may proceed to operation 462.

In operation 461, related content associated with the matched correlated vector is retrieved. As explained above, in operation 440, the method 400 records aspects of the content served in conjunction with the correlated vector. Accordingly, in operation 461, content related to the data created in operation 440 is retrieved. Thus, if the data associated with the visitor indicates that the visitor accesses football content on Monday mornings, the visitor may be served related content directed to football if the detected access associated with the retrieved vector occurs on a Monday morning.

In operation 462, the retrieved vector is compared against a default correlation. The Implementer of method 400 may find patterns about all the visitors to the content sharing service 260, or to a predefined subset of visitors. For example, in the learning mode, the Implementer of method 400 may ascertain that football content is popular amongst many visitors accessing the content sharing service 260 on a Monday morning. Accordingly, the content sharing service 260, employing method 400, may serve football related content to the visitor associated with the retrieved vector.

Certain of the devices shown in FIG. 1 include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures Including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may Include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a number of flow charts and accompanying descriptions to Illustrate the embodiments represented in FIGS. 3 and 4. The disclosed devices, components, and systems contemplate using or implementing any suitable technique for performing the steps illustrated in these figures. Thus, FIGS. 3 and 4 are for illustration purposes only and the described or similar steps may be performed at any appropriate time, including concurrently, Individually, or in combination. In addition, many of the steps in these flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for Interaction with an individual, the herein disclosed embodiments can be implemented using an interactive display, such as a graphical user Interface (GUI). Such GUI's may include interactive features such as pop-up or pull-down menus or lists, selection tabs, scannable features, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user Interaction) can be received from the client device at the server.

We claim:

1. A system comprising:
   a memory to store instructions; and
   a processor, coupled to the memory, to execute the instructions to:
      determine an access to media content of a content sharing service;
      determine parameters associated with the access to the media content, wherein the parameters comprise a user device associated with the access and a time associated with the access;
      create access data based on the determined parameters associated with the access to the media content;
      associate the access data with a user;
      storing the access data in a data store;
      determine another access to other media content of the content sharing service, the another access associated with the user,
      analyzing the access data to create selection criteria in view of the another access to the other media content; and
      determine additional media content to provide to a user device associated with the user in view of the selection criteria.

2. The system of claim 1, wherein the processor is further to:
   determine a recommendation of the additional media content to provide the user device associated with the user, wherein the access data is specific to the user.

3. The system of claim 1, wherein the parameters comprise a connection speed associated with the access.

4. The system of claim 1, wherein the parameters comprise a day of a week of the access.

5. The system of claim 1, wherein the processor is further to assign predefined weightings to the parameters to create the access data.

6. The system of claim 1, wherein the processor is further to determine features associated with the media content associated with the access.

7. The system of claim 6, wherein the processor is further to correlate the access data with the features associated with the media content.

8. The system of claim 1, wherein the user device associated with the access and the user device associated with the user are different user devices.

9. A method comprising:
   determining, by a processor, an access to media content of a content sharing service;
   determining parameters associated with the access to the media content, wherein the parameters comprise a user device associated with the access and a time associated with the access;
   creating access data based on the determined parameters associated with the access to the media content;
   associating the access data with a user;
   storing the access data in a data store;
   determining another access to other media content of the content sharing service, the another access associated with the user;
   analyzing the access data to create selection criteria in view of the another access to the other media content; and
   determining a recommendation of additional media content to provide to a user device associated with the user in view of the selection criteria.

10. The method of claim 9, further comprising:
   determining if a learning mode or a recommending mode is set;
   in response to the learning mode being set,
      determining features associated with the media content accessed via the content sharing service, and
      associating the features of the media content with the access data in the data store; and
   in response to the recommending mode being set,
      analyzing the access data to create selection criteria, and
      determining the additional media content in view of the selection criteria.

11. The method of claim 9, wherein the access data is specific to the user.

12. The method of claim 9, wherein the user device associated with the access and the user device associated with the user are different user devices.

13. The method of claim 9, wherein the parameters comprise a connection speed associated with the access.

14. The method of claim 9, wherein the user device associated with the access and the user device associated with the user are a same user devices.

15. The method of claim 9, wherein the parameters comprise a day of the access.

16. The method of claim 10, wherein in response to the learning mode being set, correlating the features associated with the media content with the access data.

17. The method of claim 9, further comprising:
   determining additional media content to provide to the user device associated with the user in view of the selection criteria.

18. The method of claim 16, wherein in response to the learning mode being set, updating the access data subsequent to correlating the features associated with the media content with the access data.

19. A non-transitory computer readable medium storing instructions, that, when executed by a processor, cause the processor to:
   determine, by the processor, an access to media content of a content sharing service;
   determine parameters associated with the access to the media content, wherein the parameters comprise a user device associated with the access and a time associated with the access;
   create access data based on the determined parameters associated with the access to the media content;
   associate the access data with a user;
   storing the access data in a data store;
   determine another access to other media content of the content sharing service, the another access associated with the user,
   analyze the access data to create selection criteria in view of the another access to the other media content; and
   determine additional media content to provide to a user device associated with the user in view of the selection criteria.

20. The non-transitory computer readable medium of claim 19, the processor further to determine a recommendation of the additional media content to provide to the user device associated with the user based.

* * * * *